United States Patent [19]

Hummel

[11] Patent Number: 4,680,827
[45] Date of Patent: Jul. 21, 1987

[54] VACUUM CLEANER

[75] Inventor: Karl Hummel, Stuttgart, Fed. Rep. of Germany

[73] Assignee: Interlava AG, Lugano, Switzerland

[21] Appl. No.: 814,545

[22] Filed: Dec. 30, 1985

[30] Foreign Application Priority Data

Sep. 28, 1985 [DE] Fed. Rep. of Germany ....... 3534621

[51] Int. Cl.$^4$ ................................................ A47L 9/28
[52] U.S. Cl. ..................................... 15/319; 250/574; 356/343; 356/438
[58] Field of Search ..................... 15/319, 339; 50/574; 356/342, 343, 438, 439

[56] References Cited

U.S. PATENT DOCUMENTS 4,297,578  10/1981  Carter ............................ 356/439 X
4,580,311   4/1986  Kurz ..................................... 15/319
4,601,082   7/1986  Kurz ..................................... 15/319

Primary Examiner—Chris K. Moore
Attorney, Agent, or Firm—McAulay, Fields, Fisher, Goldstein & Nissen

[57] ABSTRACT

In a vacuum cleaner for industry and household in which the speed control for the blower motor for the vacuum cleaner is effected by evaluating the dust concentration given at any time in the suction line by optoelectrical means (light transmitters, light receivers) it is proposed to use the signal pulses, which are derived from the light receivers depending on the measured dust particles, for controlling an additional light transmitter (luminous diode) which directly coacts with a light-sensitive resistor which is at the same time part of the control resistance of a triac connected in the motor circuit of the blower motor. Preferably, the optoelectrical dust concentration measuring arrangement may comprise a plurality of light transmitters and light receivers and may be arranged directly adjacent to the air intake opening of a vacuum cleaner housing.

4 Claims, 2 Drawing Figures

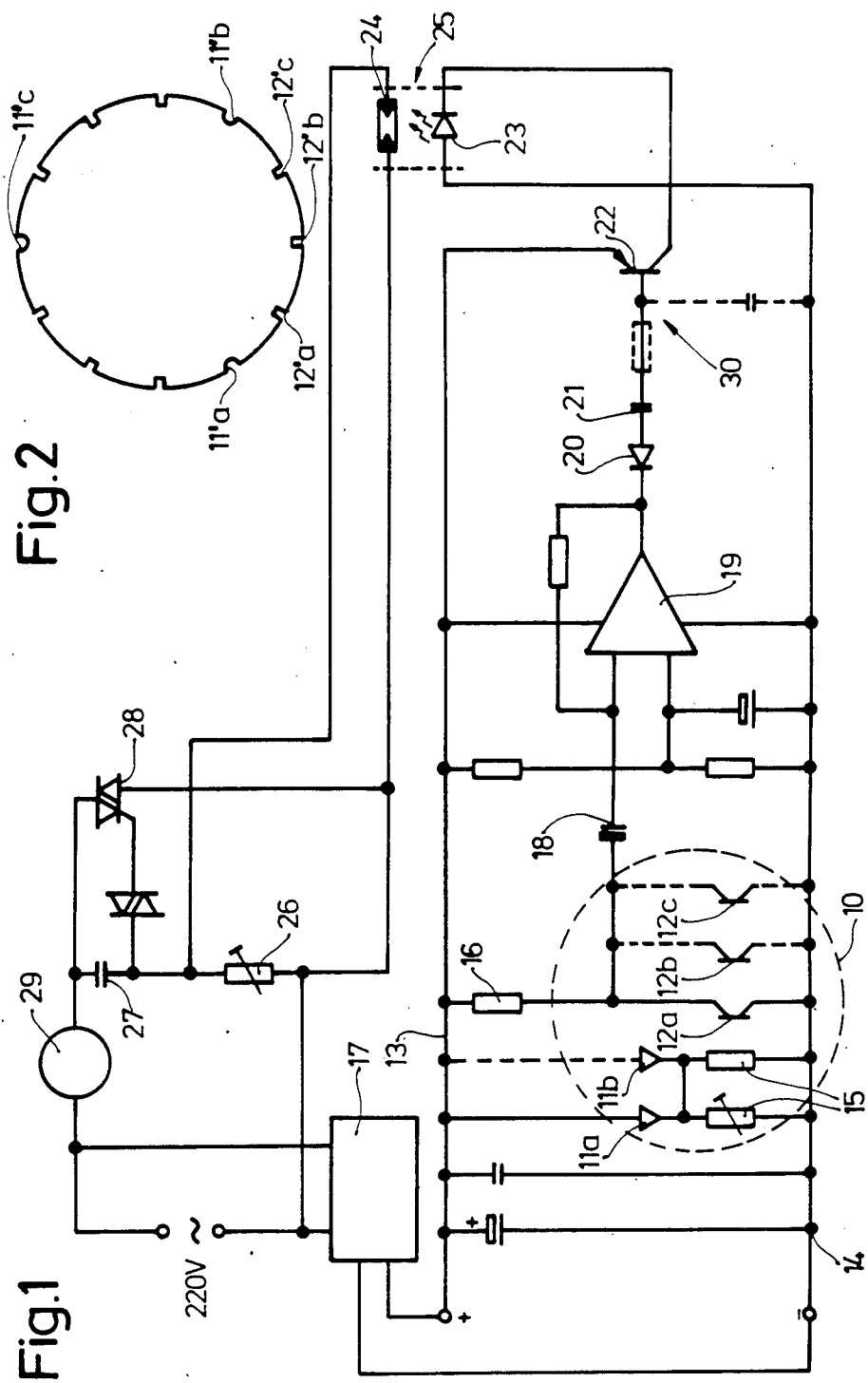

VACUUM CLEANER

BACKGROUND OF THE INVENTION

The invention starts out from a vacuum cleaner according to the preamble of the main claim. In a known vacuum cleaner of this type (German Disclosure Document No. 2 336 758) one has attempted to keep the air velocity constant in the area of the suction line or suction pipe and to provide in this manner the possibility to determine the quantity of dust, solid particles, and the like, drawn in by the vacuum cleaner, i.e. to determine the dust concentration. To this end, a light source and a photoelectric cell are provided in perpendicular arrangement relative to the air current, and the output signal of the photoelectric cell is used to influence the speed of the electric motor driving the blower of the vacuum cleaner via a corresponding control device.

Accordingly, this known vacuum cleaner proceeds from the realization that for controlling the operation or power of the vacuum cleaner it is an appropriate measure to evaluate that value which is actually influenced by the vacuum cleaner during its operation, namely the quantity of dust contained in the air. It is, therefore, a practical solution to control the power of the blower motor of a vacuum cleaner in response to the dust concentration. The before-mentioned publication does not, however, contain any indications as regards the type, design, function or possible implementations of the motor speed control operating in response to the dust concentration which is detected by optical means, and the attempt to keep the air flow constant in the measuring area of the suction pipe also does not help notably to arrive at a speed control that would suit practical needs.

Another critical point is seen in the only possibility mentioned for realizing the control, namely by means of a light source and a photoelectric cell. Such an arrangement permits, however, only to observe the dust conditions in the suction area along one single line. A real picture of the dust concentration actually encountered is not obtained so that the inaccuracy factor is correspondingly high. The publication does not contain any further information regarding the evaluation of the optically determined dust concentration. There has been further known a solution (German Disclosure Document No. 34 31 164), in which the light-optical unit comprising a luminous diode and a phototransistor is followed, after amplification of its output signals, by a switching element, i.e. a monoflop, which acts as a pulse shaper and at the same time as a delay element and which indicates the determined dust quantity by different optical means (green or red luminous diode) and can be re-triggered at any time after the end of its holding time when new dust is encountered. An evaluation block connected after the monoflop and reacting, accordingly, to the triggering signal for the luminous diodes permits the power of the blower motor of the vacuum cleaner to be controlled in response to the measured dust quantity.

This solution does not permit a continuous power control because the flip-flop action of the monoflop can be interpreted only as "up" or "down".

Now, it is the object of the present invention to improve the known vacuum cleaner in such a manner that in spite of a substantial simplification of the switching components forming the evaluation system, the power control of the blower motor will react exclusively to the dust quantity measured at any time and that, in particular, the speed is varied rapidly, instantaneously and infinitely.

ADVANTAGES OF THE INVENTION

The vacuum cleaner according to the invention achieves this object with the aid of the characterizing features of the main claim and offers the advantage that in spite of the particularly simple design of the opto-electric control circuit for the speed control, the system reacts rapidly and reliably to any changes in the measured dust concentration and the speed control is adapted continuously, i.e. infinitely to the working conditions detected by such measurement, exclusively with reference to the effective dust quantity or dust concentration. All other operating conditions of the vacuum cleaner which were heretofore regarded as relevant, such as the condition of the floor, secondary air, and the like, may be left out of regard because the solution according to the invention responds dynamically to the effectiveness of the vacuum cleaner, i.e. the dust quantities actually picked up. The circuit according to the invention responds to pulses of a corresponding level and varies directly, via a light-optical element, a resistance value in the control branch of, for example, a triac which predetermines the power absorbed by the electric motor in the manner of a phase control.

The features of the sub-claims define advantageous improvements and developments of the vacuum cleaner described by the main claim. In a particularly advantageous embodiment, the light-optical dust detecting device is arranged at or in the area of the air intake opening of the vacuum cleaner housing so that it is not necessary in this case to provide the measuring device for example in the suction hose or the handle area which would mean that the signals picked up there would have to be transmitted to the vacuum cleaner housing over the rotating joint normally required. Considering that the dust drawn in by the vacuum cleaner through the suction line appears unchanged at the air intake opening of the housing, the arrangement of the measuring means in the area of the vacuum cleaner housing does not provide any disadvantage in this respect. It is particularly advantageous in this connection to provide a greater number of light-electric units in the measuring area for determining the dust quantity as completely as possible. To this end, light transmitters in the form of luminous diodes and light receivers in the form of phototransistors may be distributed over the circumference of the measuring area in such a manner that the elements face each other in pairs so that use is made of substantially the full cross-section of the suction area for evaluating the actual dust concentration. Under these circumstances, the means for keeping the air current constant in the measuring area as provided for by the publication mentioned in the first place, corresponding to German Disclosure Document No. 2 336 758, is also irrelevant because even small dust quantities can in any case be detected safely and evaluated.

The invention can further be combined advantageously with manual power switching means as normally used with vacuum cleaners so that the operator can pre-select the power range for specific cleaning operations, such as the cleaning of curtains, pile carpets, linoleum floors, etc., in which case the fully-automatic, light-optical control means according to the present invention assumes the function to control the operation, i.e. to vary the speed, continuously within the pre-set power range, depending on the dust concentration encountered.

BRIEF DESCRIPTION OF THE DRAWING

One embodiment of the invention is shown in the drawing and will be described hereafter. In the drawing:

FIG. 1 shows the evaluation circuit for the speed control of the blower motor; and FIG. 2 is a diagrammatic cross-section through the light-optical measuring point for determining the dust concentration, preferably at the air intake opening of the vacuum cleaner housing.

DESCRIPTION OF THE EMBODIMENTS

The basic concept of the present invention consists in that the individual pulse-like output signals generated by at least one light transmitter/light receiver pair due to the deflection caused by passing dust particles, are translated quickly and, above all, in proper relation to the measured dust concentration, into an infinitely variable speed control for the blower motor of the vacuum cleaner, either by using the amplified pulse signals, which have exclusively been picked up dynamically (via capacitor coupling), which means that the signals are translated twice via light-optical units, in which case a light-sensitive resistance responds to this second light transmitter in the detection and processing chain, said resistance being a direct part of the RC combination in the triggering circuit for a triac which is connected to the motor circuit for the blower motor; or by using the continuously varying control signal (for this light transmitter) for triggering a corresponding translation or decoding matrix which effects in the control circuit for the blower drive motor of the vacuum cleaner the corresponding, preferably infinite or at least very finely graded, variations of the automatic power control in response to the dust concentration detected by the light-optical means. One could also imagine in this connection the use of computer-controlled systems, microprocessors or the like, in which case the continuously varying voltage, i.e. the control signal, could be translated into an address and supplied to a storage which would then, after this transition to digital processing, give out a corresponding command structure suitable for effecting the power control of the blower drive motor. It goes, therefore, without saying that the block diagram shown in the drawing in which the invention is described by way of discrete working points, does not in any way restrict the invention, but is only meant to illustrate the basic functional effects of the invention and to describe special functional sequences of one possible implementation. It is possible to build up the individual components and blocks in analog, digital or hybrid form or to adapt corresponding sections of program-controlled digital systems, i.e. microprocessors, microcomputers, digital or analog logic circuits or the like, in a suitable manner. The following description of the invention is, therefore, to be understood only as a preferred embodiment as regards the functional sequence and the sequence in time of the functions achieved by the described blocks or discrete circuit elements and the interaction of the partial functions provided by the individual components, all references to individual circuit blocks being made only with a view to facilitating the understanding of the invention.

In FIG. 1, the opto-electric measuring unit for detecting the dust concentration is designated by reference numeral 10. It comprises at least one, preferably however a greater number of luminous diodes (LED) 11a, 11b ... emitting light, in particular infrared light, and a corresponding, or even greater number, of phototransistors 12a, 12b, 12c ... which are sensitive to light, in particular to light in the infrared range. The at least one luminous diode 11a, 11b ... and the at least one phototransistor 12a, 12b ... are connected to a d.c. supply (positive conductor 13, negative conductor 14) and connected in series with series resistances 15 and 16, respectively, it being also possible to provide adjustable series resistances, in particular for the luminous diodes 11a, 11b.

As the opto-electric measuring unit 10 for determining the dust concentration is provided advantageously in the air intake opening, but within the vacuum cleaner housing, it is supplied with current through a suitable power pack 17 from the mains voltage which is anyway available in the vacuum cleaner housing. This provides the additional advantage that there is no need to run any control lines through the flexible suction hose or to transmit power control signals, which have been picked up for example in the handle, to the speed control via electric lines and the rotary joint between the vacuum cleaner housing and the connection hose.

A preferred embodiment, as regards a distribution of the light transmitters and light receivers in the area of the air intake opening of the vacuum cleaner housing, is shown in FIG. 2. It will be seen that there are distributed about the circumference of the opening three light transmitters, i.e. luminous diodes 11a', 11b', 11c' and, in the present case, three times that number of light receivers 12a', 12b', 12c' intended for receiving the light emitted by the associated, i.e. oppositely arranged, luminous diodes, it being, however, understood that the types, assignment and distribution of the light transmitters and light receivers over the circumference of the measuring cross-section may be selected at desire, provided the fullest possible coverage of the cross-sectional area is achieved.

The light transmitters and the light receivers may be provided in pairs and arranged to face each other across the cross-section of the opening, or else it is also possible to associate with each light transmitter a greater number of light receivers arranged within the light cone.

For evaluation purposes, the plurality of the light receivers arranged about the measuring cross-section may simply be connected in parallel, as shown in FIG. 1 by broken lines for the phototransistors 12b, 12c. In this case, the united connections transmit their signals via a capacitor 18 to the one input of an amplifier 19 which can be used also for generating a threshold value, so that only signals or composite signals which exceed a given amplitude will be transmitted by the output to a diode 20 whose given breakdown voltage also forms a threshold value. The dynamic pulses (coupling via capacitor 21) generated by the phototransistors 12a, 12b, 12c ... and resulting exclusively from the movement of the dust are then supplied, via a capacitor 21 following the diode 20, to a subsequent control electrode of a transistor 22 which is driven continuously by the (operational) amplifier in response to the dust quantity. A further light-emitting diode 23 provided in the collector circuit of the said transistor 22 forms together with an associated light-sensitive resistor (LDR resistor 24) an opto-electric coupling element 25—which constitutes at the same time a galvanic isolation—and controls at the same time the motor current for the blower motor 29 of the vacuum cleaner, via the phase control thus formed, the light-sensitive resistor 24 being a parallel resistance 26 in the control circuit formed by the capacitor 27 and the resistance 26, 24 for a triac 28. As mentioned before, it is also possible to use additional means at this point.

The speed control of the invention which acts in response to the measured dust concentration reacts extremely quickly to any changes in the quantities of dust encountered and can, therefore, be regarded as a useful practical embodiment which permits particularly efficient cleaning and helps at the same time to save energy and operating costs. The system merely reacts dynamically to pulses resulting from the individual dust particles—though a certain stabilization of the switching sequence is obtained through the transistor 22 which is driven via a capacitor 21. Further, the photosensitive resistor 24 in the control circuit for the triac 28 also has a slightly integrating effect because it reacts to changes in the intensity of the light with a certain delay, though in the range of milliseconds. Depending on the desired characteristics of the speed control it is of course also possible to arrange an additional integrating RC element 30 for example in the control of the transistor 22, as shown in broken lines.

In order to steady down the pulses and pulse sequences appearing for example at the output of the amplifier 19 it is further possible to provide a pulse shaper and delay stage, for example the monoflop known from German Disclosure Document No. 34 31 164, with the desired adjustable delay time. In this case, the output of the monoflop may provide corresponding optical indications of the presence of dust or substantially dust-free areas during the cleaning process. Such an optical dust indication may of course be derived also from the output signal of the transistor 22 and may be transmitted, if desired via integrating elements, to separate indicating means, such as luminous diodes, lamps, or acoustic indications.

Finally, instead of providing the light-sensitive resistor 24 arranged immediately in the control circuit for the triac, it is also possible to select a different, though somewhat more complex control in which the light of the luminous diode 23 is again picked up by a photo transistor but then used, after having been amplified, for controlling a pre-triac which projects a resistance parallel to the existing resistance 26, via a bridge rectifier and an intermediate, electrically isolating transformer, the resistance 26 resulting from the respective conductivity control of the additional triac. Such circuits are known as such and are normally used when a resistance control for an a.c. voltage is required.

All features mentioned or shown in the above description, the following claims and the drawing may be essential to the invention either alone or in any combination thereof.

I claim:

1. A vacuum cleaner comprising a housing, a blower within said housing for creating the vacuum, a motor connected to said blower for driving said blower, a control circuit connected to said motor for controlling the operation thereof in response to a control signal, a suction channel extending from said blower to the exterior of said housing to provide a path for the movement of material picked up by said vacuum cleaner, at least a light transmitter and a light receiver in said suction channel positioned so that the material will pass between said light transmitter and receiver, and sensing means connected to said receiver and said control circuit for sensing changes in the light transmission characteristics between said transmitter and receiver due to the material passing therebetween and for producing a control signal proportional thereto; characterized in that said sensing means includes a control light transmitter at the output thereof, and a light-sensitive resistor connected in circuit with said control circuit and responsive to changes in the light produced by said control light transmitter to vary the power applied to said motor.

2. A vacuum cleaner according to claim 1, in which said light receiver comprises a phototransistor; and said sensing means comprises an amplifier having an input connected to said phototransistor and an output, said control light transmitter comprising a luminous diode, and a circuit comprising a diode having a preselected threshold value, a capacitor and a driving transistor connected between said amplifier output and said luminous diode.

3. A vacuum cleaner according to claim 1, in which said control circuit includes a resistor-capacitor circuit, and lead means connecting said light sensitive resistor in parallel with the resistor element of said resistor-capacitor circuit.

4. A vacuum cleaner as in claim 1, in which said suction channel terminates in an air intake opening, and a plurality of light transmitter adjacent said air intake opening, each of said light transmitters comprising a luminous diode having a light cone, and said light receiver comprises at least one phototransistor in one of said light cones.

* * * * *